US012675987B2

(12) United States Patent
Bai et al.

(10) Patent No.: US 12,675,987 B2
(45) Date of Patent: Jul. 7, 2026

(54) MULTIMODAL DATA PROCESSING

(71) Applicants: Lemon Inc., Grand Cayman (KY);
**Beijing Youzhuju Network
Technology Co., Ltd.**, Beijing (CN)

(72) Inventors: Song Bai, Singapore (SG); Rui Yan,
Beijing (CN); Heng Wang, Los
Angeles, CA (US); Junhao Zhang,
Singapore (SG); Chuhui Xue,
Singapore (SG); Wenqing Zhang,
Singapore (SG)

(73) Assignees: LEMON INC., Grand Cayman (KY);
**BEIJING YOUZHUJU NETWORK
TECHNOLOGY CO., LTD.**, Beijing
(CN)

( * ) Notice: Subject to any disclaimer, the term of this
patent is extended or adjusted under 35
U.S.C. 154(b) by 381 days.

(21) Appl. No.: 18/393,238

(22) Filed: Dec. 21, 2023

(65) Prior Publication Data

US 2024/0144664 A1 May 2, 2024

(30) Foreign Application Priority Data

Jan. 4, 2023 (CN) .......................... 202310009740.0

(51) Int. Cl.
*G06V 10/82* (2022.01)
*G06V 10/46* (2022.01)

(52) U.S. Cl.
CPC ............ *G06V 10/82* (2022.01); *G06V 10/467*
(2022.01)

(58) Field of Classification Search
CPC .............................. G06V 10/82; G06V 10/467
See application file for complete search history.

(56) References Cited

U.S. PATENT DOCUMENTS 12,056,458 B2 * 8/2024 Meng .................... G06F 40/205
12,271,792 B2 * 4/2025 Li ............................ G06N 3/09
(Continued)

FOREIGN PATENT DOCUMENTS

CN 108846375 B 6/2019
CN 107562812 B 1/2021
(Continued)

OTHER PUBLICATIONS

Li, Gen, et al. "Unicoder-vl: A universal encoder for vision and
language by cross-modal pre-training." Proceedings of the AAAI
conference on artificial intelligence. vol. 34. No. 07. 2020. (Year:
2020).*

(Continued)

*Primary Examiner* — Utpal D Shah
(74) *Attorney, Agent, or Firm* — Astute IP Law Group

(57) ABSTRACT

Embodiments of the present disclosure provide a solution
for multimodal data processing. A method comprises:
obtaining image data and text data; and extracting a target
visual feature of image data and a target textual feature of
text data using a feature extraction model. The feature
extraction model comprises alternatively deployed cross-
modal encoding parts and visual encoding parts. The extract-
ing comprises: performing, using a first cross-modal encod-
ing part of the feature extraction model, cross-modal feature
encoding on a first intermediate visual feature of the image
data and a first intermediate textual feature of the text data,
to obtain a second intermediate visual feature and a second
intermediate textual feature; performing, using a first visual
encoding part of the feature extraction model, visual modal
feature encoding on the second intermediate visual feature,
to obtain a third intermediate visual feature.

20 Claims, 11 Drawing Sheets

(56) References Cited

U.S. PATENT DOCUMENTS

| | | | |
|---|---|---|---|
| 2022/0382975 A1 | 12/2022 | Gu et al. | |
| 2022/0391755 A1* | 12/2022 | Li | G06V 30/153 |
| 2023/0281751 A1* | 9/2023 | Yan | G06N 3/0464 |
| | | | 382/100 |
| 2023/0386168 A1* | 11/2023 | Sun | G06N 3/045 |
| 2024/0095989 A1* | 3/2024 | Mallya | G06V 20/46 |
| 2024/0119743 A1* | 4/2024 | Xue | G06V 30/19093 |
| 2024/0169711 A1* | 5/2024 | Choudhary | G06V 10/806 |
| 2024/0185602 A1* | 6/2024 | Liu | G06N 3/0895 |
| 2024/0281609 A1* | 8/2024 | Lv | G06F 18/00 |
| 2025/0371362 A1* | 12/2025 | Zhang | G06N 3/045 |

FOREIGN PATENT DOCUMENTS

| | | |
|---|---|---|
| CN | 110149541 B | 8/2021 |
| CN | 114283430 A | 4/2022 |
| CN | 114942984 A | 8/2022 |
| CN | 115168638 A | 10/2022 |
| CN | 115392365 A | 11/2022 |
| WO | 2022250745 A1 | 12/2022 |

OTHER PUBLICATIONS

Tan, Hao, and Mohit Bansal. "Lxmert: Learning cross-modality encoder representations from transformers." arXiv preprint arXiv: 1908.07490 (2019). (Year: 2019).*
Office Action for Chinese Patent Application No. 202310009740.0, mailed on Oct. 20, 2025, 8 pages.

* cited by examiner (a) DUAL-STREAM PROCESSING (b) HYBRID STREAM PROCESSING (C) UNIFIED STREAM PROCESSING (a) RANDOM
SCHEME 701

(b) UNIFORM SCHEME
702

(c) GRADUAL
SCHEME A
703

(d) GRADUAL
SCHEME B
704

712 CROSS-MODAL ENCODING LAYER

722 VISUAL ENCODING LAYER

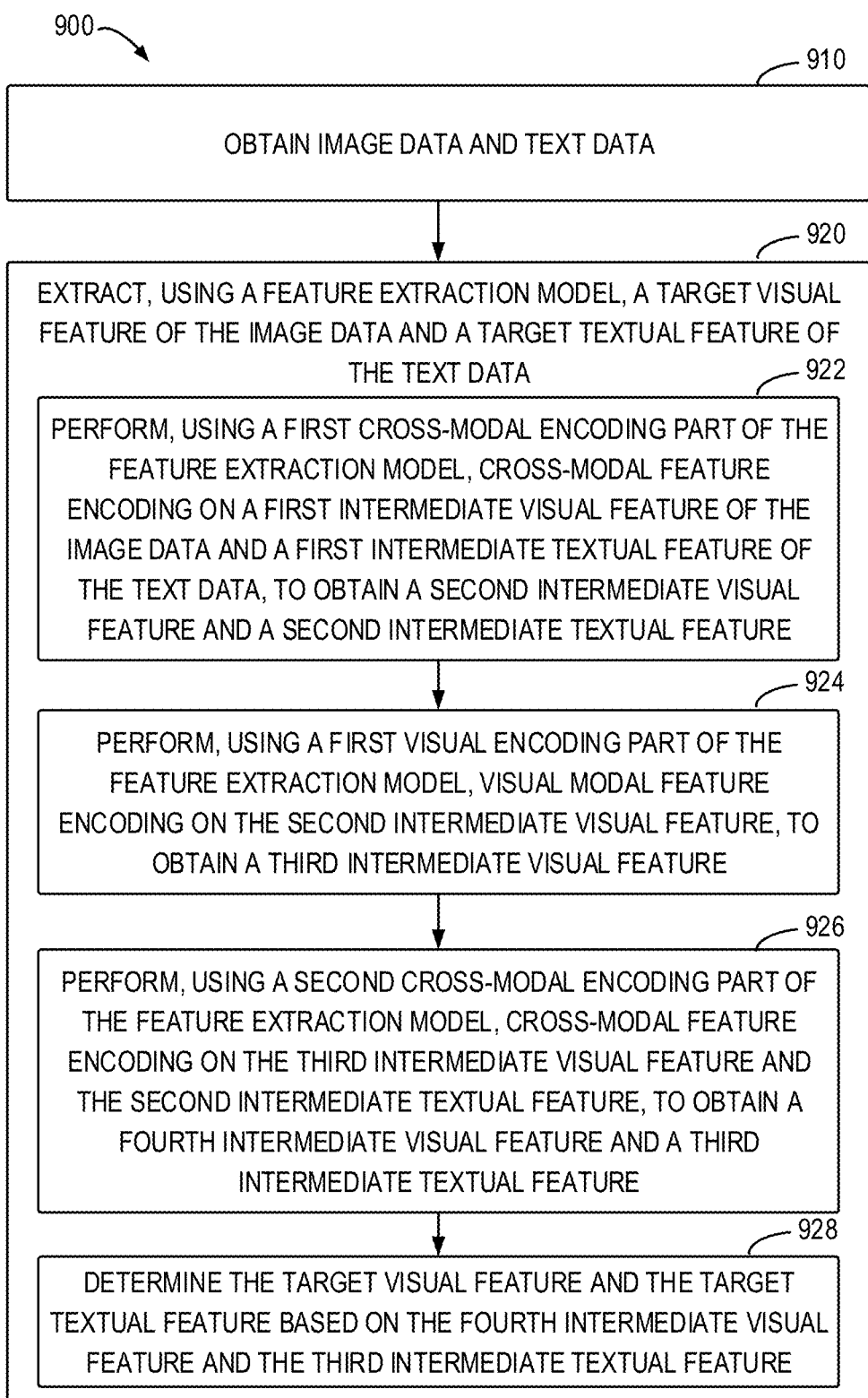

900

910
OBTAIN IMAGE DATA AND TEXT DATA

920
EXTRACT, USING A FEATURE EXTRACTION MODEL, A TARGET VISUAL FEATURE OF THE IMAGE DATA AND A TARGET TEXTUAL FEATURE OF THE TEXT DATA

922
PERFORM, USING A FIRST CROSS-MODAL ENCODING PART OF THE FEATURE EXTRACTION MODEL, CROSS-MODAL FEATURE ENCODING ON A FIRST INTERMEDIATE VISUAL FEATURE OF THE IMAGE DATA AND A FIRST INTERMEDIATE TEXTUAL FEATURE OF THE TEXT DATA, TO OBTAIN A SECOND INTERMEDIATE VISUAL FEATURE AND A SECOND INTERMEDIATE TEXTUAL FEATURE

924
PERFORM, USING A FIRST VISUAL ENCODING PART OF THE FEATURE EXTRACTION MODEL, VISUAL MODAL FEATURE ENCODING ON THE SECOND INTERMEDIATE VISUAL FEATURE, TO OBTAIN A THIRD INTERMEDIATE VISUAL FEATURE

926
PERFORM, USING A SECOND CROSS-MODAL ENCODING PART OF THE FEATURE EXTRACTION MODEL, CROSS-MODAL FEATURE ENCODING ON THE THIRD INTERMEDIATE VISUAL FEATURE AND THE SECOND INTERMEDIATE TEXTUAL FEATURE, TO OBTAIN A FOURTH INTERMEDIATE VISUAL FEATURE AND A THIRD INTERMEDIATE TEXTUAL FEATURE

928
DETERMINE THE TARGET VISUAL FEATURE AND THE TARGET TEXTUAL FEATURE BASED ON THE FOURTH INTERMEDIATE VISUAL FEATURE AND THE THIRD INTERMEDIATE TEXTUAL FEATURE

*FIG. 9*

MULTIMODAL DATA PROCESSING

CROSS-REFERENCE

The present application claims priority to Chinese Patent Application No. 202310009740.0, filed on Jan. 4, 2023 and entitled "METHOD, APPARATUS, DEVICE AND MEDIUM FOR MULTIMODAL DATA PROCESSING", the entirety of which is incorporated herein by reference.

FIELD

The disclosed example embodiments relate generally to machine learning and, more particularly, to a method, apparatus, device and computer readable storage medium for multimodal data processing.

BACKGROUND

Image-text matching is a typical task in the field of vision and language, involving data processing of different modalities. Image data can comprise dynamic images, such as videos and static images, such as single images. The image-text matching can be used to retrieve images from text or retrieve text from images. The main challenge of this task is to align semantics between different modalities. In recent years, it has become a trend to pre-train or train models from large-scale video-text content. The model modeling process can mine sufficient cross-modal clues for this task.

SUMMARY

In a first aspect of the present disclosure, there is provided a method for multimodal data processing. The method comprising: obtaining image data and text data; and extracting, using a feature extraction model, a target visual feature of the image data and a target textual feature of the text data, the feature extraction model comprises alternately deployed cross-modal encoding parts and visual encoding parts, and the extracting comprises: performing, using a first cross-modal encoding part of the feature extraction model, cross-modal feature encoding on a first intermediate visual feature of the image data and a first intermediate textual feature of the text data, to obtain a second intermediate visual feature and a second intermediate textual feature; performing, using a first visual encoding part of the feature extraction model, visual modal feature encoding on the second intermediate visual feature, to obtain a third intermediate visual feature; performing, using a second cross-modal encoding part of the feature extraction model, cross-modal feature encoding on the third intermediate visual feature and the second intermediate textual feature, to obtain a fourth intermediate visual feature and a third intermediate textual feature; and determining the target visual feature and the target textual feature based on the fourth intermediate visual feature and the third intermediate textual feature.

In a second aspect of the present disclosure, there is provided an electronic device. The device comprises at least one processing unit; and at least one memory coupled to the at least one processing unit and storing instructions executable by the at least one processing unit. The instructions, upon execution by the at least one processing unit, cause the device to perform the method of the first aspect.

In a third aspect of the present disclosure, a non-transitory computer-readable storage medium is provided. The medium stores a computer program which, when executed by a processor, causes the method of the first aspect to be implemented.

It would be appreciated that the content described in the Summary section of the present invention is neither intended to identify key or essential features of the embodiments of the present disclosure, nor is it intended to limit the scope of the present disclosure. Other features of the present disclosure will be readily envisaged through the following description.

BRIEF DESCRIPTION OF THE DRAWINGS

The above and other features, advantages and aspects of the embodiments of the present disclosure will become more apparent in combination with the accompanying drawings and with reference to the following detailed description. In the drawings, the same or similar reference symbols refer to the same or similar elements, where:

FIG. 9 illustrates a flow chart of a process for multimodal data processing in accordance with some embodiments of the present disclosure;

DETAILED DESCRIPTION

Figure 1:
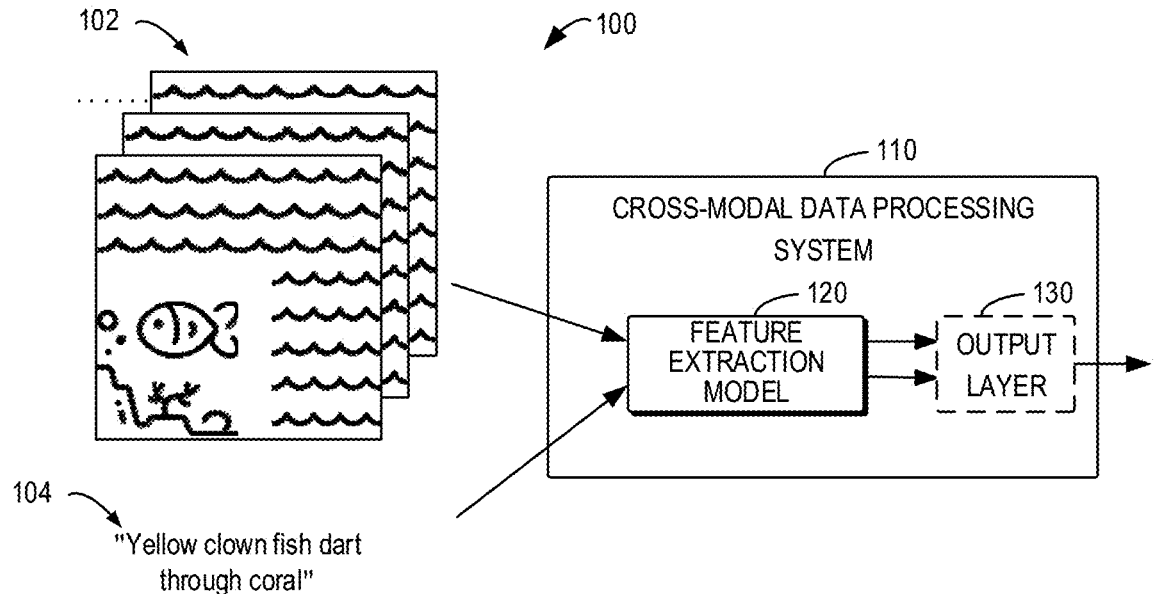
FIG. 1 illustrates a schematic diagram of an example data processing environment in which embodiments of the present disclosure can be implemented.

The embodiments of the present disclosure will be described in more detail below with reference to the accompanying drawings. Although some embodiments of the present disclosure are shown in the drawings, it would be appreciated that the present disclosure may be implemented in various forms and should not be interpreted as limited to the embodiments described herein. On the contrary, these embodiments are provided for a more thorough and complete understanding of the present disclosure. It would be appreciated that the drawings and embodiments of the present disclosure are only for the purpose of illustration and are not intended to limit the scope of protection of the present disclosure.

In the description of the embodiments of the present disclosure, the term "including" and similar terms would be appreciated as open inclusion, that is, "including but not limited to". The term "based on" would be appreciated as "at least partially based on". The term "one embodiment" or "the embodiment" would be appreciated as "at least one embodiment". The term "some embodiments" would be appreciated as "at least some embodiments". Other explicit and implicit definitions may also be included below. As used herein, the term "model" can represent the matching degree between various data. For example, the above matching degree can be obtained based on various technical solutions currently available and/or to be developed in the future.

It will be appreciated that the data involved in this technical proposal (including but not limited to the data itself, data acquisition or use) shall comply with the requirements of corresponding laws, regulations and relevant provisions.

It will be appreciated that before using the technical solution disclosed in each embodiment of the present disclosure, users should be informed of the type, the scope of use, the use scenario, etc. of the personal information involved in the present disclosure in an appropriate manner in accordance with relevant laws and regulations, and the user's authorization should be obtained.

For example, in response to receiving an active request from a user, a prompt message is sent to the user to explicitly prompt the user that the operation requested operation by the user will need to obtain and use the user's personal information. Thus, users may select whether to provide personal information to the software or the hardware such as an electronic device, an application, a server or a storage medium that perform the operation of the technical solution of the present disclosure according to the prompt information.

As an optional but non-restrictive implementations, in response to receiving the user's active request, the method of sending prompt information to the user may be, for example, a pop-up window in which prompt information may be presented in text. In addition, pop-up windows may also contain selection controls for users to choose "agree" or "disagree" to provide personal information to electronic devices.

It will be appreciated that the above notification and acquisition of user authorization process are only schematic and do not limit the implementations of the present disclosure. Other methods that meet relevant laws and regulations may also be applied to the implementation of the present disclosure.

As used herein, the term "model" can learn a correlation between respective inputs and outputs from training data, so that a corresponding output can be generated for a given input after training is completed. The generation of the model can be based on machine learning techniques. Deep learning is a machine learning algorithm that processes inputs and provides corresponding outputs by using multiple layers of processing units. A neural networks model is an example of a deep learning-based model. As used herein, "model" may also be referred to as "machine learning model", "learning model", "machine learning network", or "learning network", and these terms are used interchangeably herein.

"Neural networks" are a type of machine learning network based on deep learning. Neural networks are capable of processing inputs and providing corresponding outputs, typically comprising input and output layers and one or more hidden layers between the input and output layers. Neural networks used in deep learning applications typically comprise many hidden layers, thereby increasing the depth of the network. The layers of neural networks are sequentially connected so that the output of the previous layer is provided as input to the latter layer, where the input layer receives the input of the neural network and the output of the output layer serves as the final output of the neural network. Each layer of a neural network comprises one or more nodes (also known as processing nodes or neurons), each of which processes input from the previous layer.

Usually, machine learning can roughly comprise three stages, namely training stage, test stage, and application stage (also known as inference stage). During the training stage, a given model can be trained using a large scale of training data, iteratively updating parameter values until the model can obtain consistent inference from the training data that meets the expected objective. Through the training, the model can be considered to learn the correlation between input and output (also known as input-to-output mapping) from the training data. The parameter values of the trained model are determined. In the test stage, test inputs are applied to the trained model to test whether the model can provide correct outputs, thereby determining the performance of the model. In the application stage, the model can be used to process actual inputs and determine corresponding outputs based on the parameter values obtained from training."

FIG. 1 illustrates a schematic diagram of an example data processing environment 100 in which embodiments of the present disclosure can be implemented. In the environment 100 of FIG. 1, a cross-modal data processing system 110 processes pairs of image data 102 and text data 104. Here, the image data 102 may include dynamic image data or static image data. The dynamic image data is, for example, a video, where each video frame in the video can be considered a single image. The static image data is a single image. In the example of FIG. 1 and below, the image data 102 is illustrated as video data, including a plurality of video frames. However, it should be appreciated from the description below that embodiments of the present disclosure can also be applicable to static image data.

In many application scenarios, there are situations where image modal data and text modal data are to be processed. For example, some application scenarios involve image and text matching tasks. Such tasks include retrieving images from text, retrieving text from images, video/image questioning and answering (to retrieve answers to questions from videos or images), and so on. The machine learning technology can be applied for the tasks involving multimodal data, providing feature extraction models to extract the respective features of image data and text data. A feature is a vector with specific dimensions, also known as a feature representation, feature vector, feature code, or the like. These terms are used interchangeably herein. The extracted features can represent corresponding data in a specific dimensional space.

In FIG. 1, the cross-modal data processing system 110 utilizes a feature extraction model 120 to extract a target visual feature of the image data 102 and a target textual feature of the text data 104. Depending on the specific task, the target visual feature and the target textual feature are provided to an output layer 130 for determining the task output. In the matching task, the output layer 130 is configured to determine whether the image data 102 and the text data 104 match with each other based on the target visual feature and the target textual feature. Matching means that the text data 104 accurately describes the information expressed in the image data 102. For example, in the example of FIG. 1, the text data 104 is an English sentence "Yellow clown fish dart through coral", which accurately describes the information presented by the image data 102 in form of video. If the feature extraction model 120 can extract visual features and textual features that are aligned or matched with each other, the correct matching result can be determined based on these two features.

It is noted that the example image data and text data in FIG. 1 are given for the purpose of illustration only, and the scope of embodiments of the present disclosure should not be limited to any particular form of text and image data.

It can be seen that during the cross-modal data processing, it is an important task to extract feature representations that can accurately represent each modal data from the image data and text data. The architecture deployment of the feature extraction model will affect the feature extraction capability.

In some embodiments, the training process of the feature extraction model 120 may include a pre-training process and a fine-tuning process. Large-scale pre-trained models typically have strong generalization capabilities and efficient use of large-scale data. After the model is pre-trained on a large scale of data, the pre-trained model can be fine-tuned with a small amount of data based on the specific requirements of different downstream tasks. This can significantly improve the efficiency of overall model learning and reduce the demand for labeled data for specific downstream tasks. The trained feature extraction model 120 can be provided for use in specific scenarios.

Figure 2:
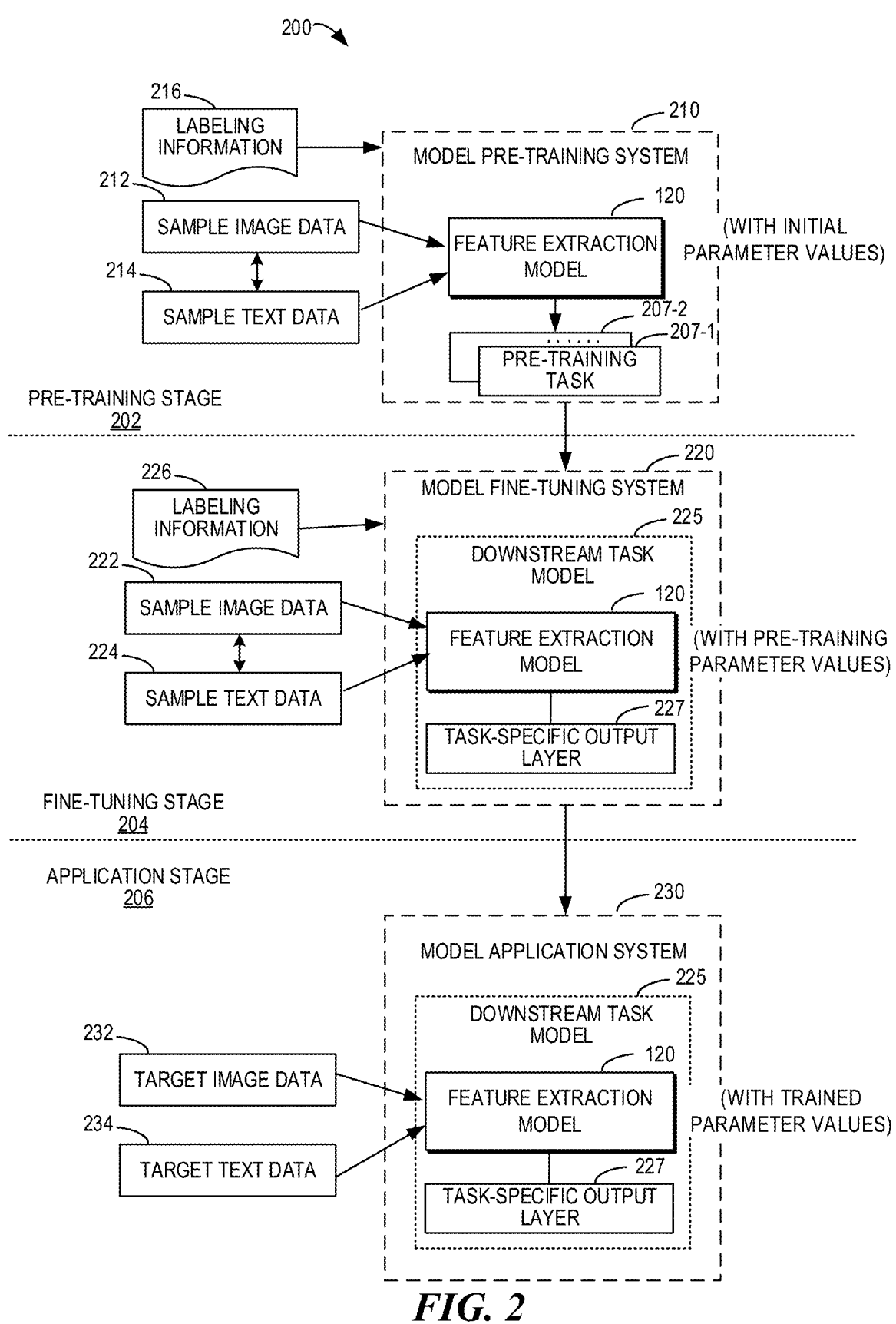
FIG. 2 illustrates a schematic diagram of a model training and application environment in which embodiments of the present disclosure can be implemented.

FIG. 2 illustrates a schematic diagram of a model training and application environment 200 in which embodiments of the present disclosure can be implemented. Three different stages of the model are illustrated in the environment 200 of FIG. 2, including a pre-training stage 202, a fine-tuning stage 204, and an application stage 206. There may also be a test stage after the pre-training or fine-tuning stage is completed, which is not illustrated in the figure.

During the pre-training stage 202, a model pre-training system 210 is configured to pre-train the feature extraction model 120. At the beginning of pre-training, the feature extraction model 120 may have initial parameter values. The pre-training process is to update the parameter values of the feature extraction model 120 to the expected values based on the training data.

The training data used by the pre-training includes sample image data 212 and sample text data 214, and may also include labeling information 216. The labeling information 216 may be used to indicate whether the sample image data 212 and sample text data 214 input to the feature extraction model 120 match with each other. Although a pair of sample images and text is illustrated, a large number of sample images and text are utilized in the pre-training stage for training. During the pre-training process, one or more pre-training tasks 207-1, 207-2, . . . may be designed. A pre-training task is used to facilitate the parameter updates of the feature extraction model 120. The parameter updates of some pre-training tasks may be performed based on the labeling information 216.

In the pre-training stage 202, the feature extraction model 120 can learn strong generalization capability from the large amount of training data. After the pre-training is completed, the parameter values of the feature extraction model 120 have been updated as pre-trained parameter values. The pre-trained feature extraction model 120 can extract the feature representation of the input data in a more accurate way.

The pre-trained feature extraction model 120 can be provided to the fine-tuning stage 204, and fine-tuned by the model fine-tuning system 220 for different downstream tasks. In some embodiments, depending on the downstream task, the pre-trained feature extraction model 120 can be connected to a corresponding task-specific output layer 227 to construct a downstream task model 225. This is because the output required for different downstream tasks may be different.

In the fine-tuning stage 204, training data are further utilized to adjust the parameter values of the feature extraction model 120. If required, the parameters of the task feature output layer 227 may also be adjusted. The training data used in the fine-tuning stage includes sample image data 222 and sample text data 224, and may also include labeling information 226. The labeling information 226 may be used to indicate whether the sample image data 222 and sample text data 224 input to the feature extraction model 120 match with each other. Although a pair of sample images and text are illustrated, a certain amount of sample images and text may be utilized in the fine-tuning stage for training. The feature extraction model 120 may perform feature representation extraction on the input image data and text data and provide it to the task-specific output layer 227 to generate an output corresponding to the task.

At the fine-tuning, the respective training algorithms are also applied to update and adjust the parameters of the overall model. Since the feature extraction model 120 has learned a lot from the training data in the pre-training stage, a small amount of training data are needed in the fine-tuning stage 204 to obtain the expected downstream task model.

In some embodiments, during the pre-training stage 202, depending on the objectives of the pre-training task, one or more task-specific output layers may have been constructed for pre-training the feature extraction model 120 in a plurality of downstream tasks. In this case, if a task-specific output layer used in the downstream task is the same as the task-specific output layer constructed during the pre-training, the pre-trained feature extraction model 120 and the task-specific output layer can be directly used to form the corresponding downstream task model. In this case, the fine-tuning of the downstream task model may be skipped or only a small amount of training data is required for fine-tuning.

In the application stage 206, the obtained downstream task model 225 has trained parameter values that can be provided to the model application system 230 for use. In the application stage 206, the downstream task model 225 can be used to process real-world inputs and provide corresponding outputs. For example, the feature extraction model 120 in the downstream task model 225 receives input target image data 232 and target text data 234 to extract a target visual feature and a target textual feature, respectively. The extracted target visual feature and target textual feature are provided to the task feature output layer 227 to determine an output of the corresponding task. Generally, this output can be summarized as determining whether the target image data 232 and the target text data 234 matches with each other or the match degree.

In FIGS. 1 and 2, the cross-modal data processing system 110, the model pre-training system 210, the model fine-tuning system 220, and the model application system 230 may include any computing system having computing capability, such as various computing devices/systems, terminal devices, servers, etc. The terminal devices may include any type of mobile terminal, fixed terminal, or portable terminal, including mobile phones, desktop computers, laptop computers, notebook computers, netbook computers, tablet computers, media computers, multimedia tablets, or any combination of the foregoing, including accessories and peripherals of these devices, or any combination thereof.

It would be appreciated that the components and arrangements in the environment 100 and environment 200 illustrated in FIGS. 1 and 2 are merely examples, and a computing system suitable for implementing the example implementations described in the present disclosure may include one or more different components, other components, and/or different arrangements. For example, although illustrated as being separated from each other, the model pre-training system 210, the model fine-tuning system 220, and the model application system 230 may be integrated in the same system or device. The implementations of the present disclosure are not limited in this regard.

In some embodiments, the training stage of the feature extraction model 120 may not be divided into a pre-training stage and a fine-tuning stage illustrated in FIG. 2, but may be constructed directly based on the downstream task model and using a large amount of training data to train the feature extraction model.

It has been discussed above some example environments for feature extraction for image modality and text modality. To deal with data of different modalities, the architecture of the feature extraction model needs to be specially designed. Some schemes propose example architectures for feature extraction models.

Figure 3A:
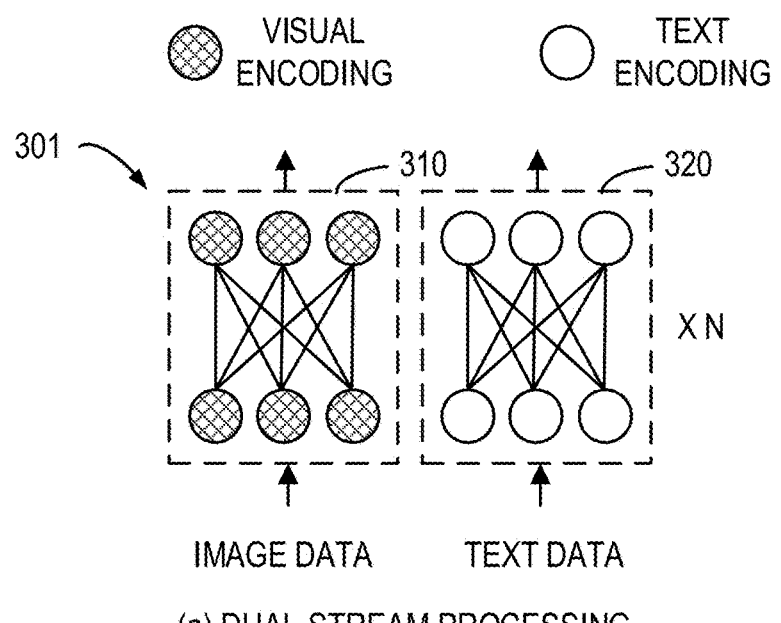
FIGS. 3A to 3C illustrate schematic diagrams of an example model architecture for multimodal feature extraction.
Figure 3B:
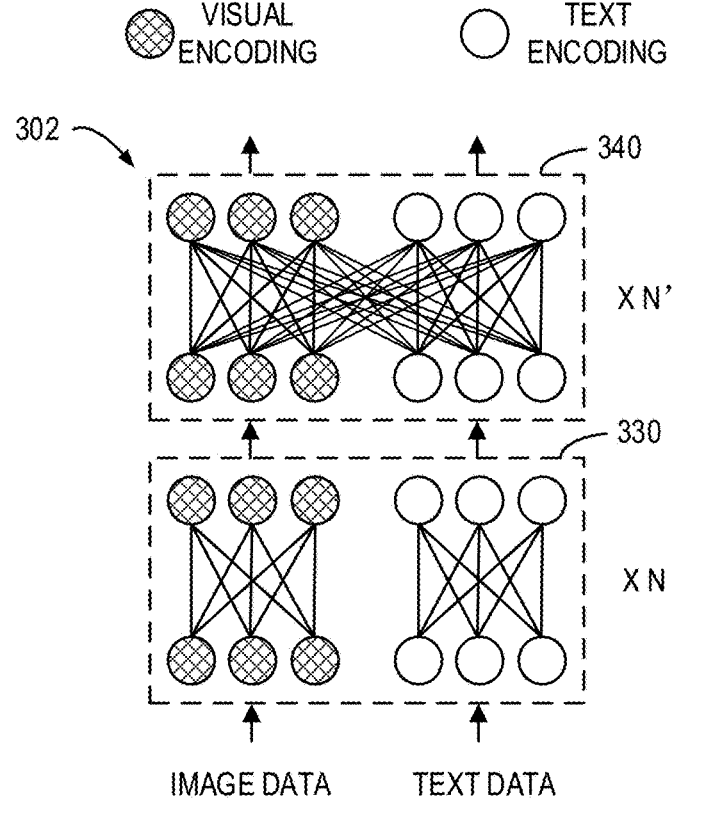
Figure 3C:
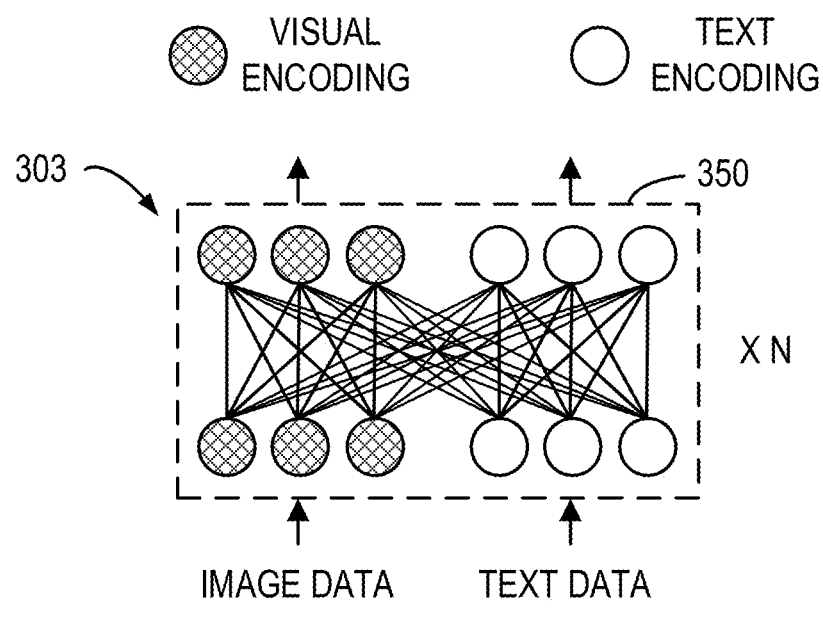

FIGS. 3A to 3C illustrate schematic diagrams of example model architecture for multimodal feature extraction. A dual-stream processing-based architecture 301 illustrated in FIG. 3A includes independent parallel visual encoding parts 310 and text encoding parts 320. The number of visual encoding parts 310 and the number of text encoding parts 320 are set to N, respectively, where N can be an integer greater than or equal to 1. Each visual encoding part 310 includes a plurality of visual encoding units for extracting visual features of image data. Each text encoding part 320 includes a plurality of text encoding units for processing textual features of text data.

A hybrid stream-based architecture 302 illustrated in FIG. 3B includes N uni-modal encoding parts 330, which may be similar to the architecture 301 of FIG. 3A, including independently parallel visual encoding parts and text encoding parts for encoding visual features and textual features independently. The architecture 302 further includes N' cross-modal encoding parts 340 for unified fusion, where N' and N may be the same or different. The cross-modal encoding parts 340 are configured for cross-modal encoding on the textual features and visual features received from the separate uni-modal encoding parts 330.

A unified stream processing based architecture 303 illustrated in FIG. 3C includes N cross-modal encoding parts 350, which are similar to the cross-modal encoding parts 340 of FIG. 3B. Image data and text data are directly input to the cross-modal encoding parts 350 to perform cross-modal encoding to output visual features and textual features.

The architecture based on the dual-stream processing can independently encode each modularity, but has limited capability to align cross-modal semantics. The architecture based on the hybrid stream processing adds unified fusion on the basis of independent dual-stream processing to fuse information from two modalities, thereby obtaining cross-modal alignment capability. However, the computational overhead of the architecture based on hybrid stream processing is too high. The architecture based on the unified stream processing only relies on a single processing stream to jointly encode two modalities, which can effectively achieve training convergence and increase cross-modal alignment capability. Although the architecture based on the unified stream processing is relatively lightweight, it still requires large computational overhead when training on large-scale data, and the model generalization capability is poor, resulting in poor performance in some tasks. The inventor found through research and analysis that this may be due to the dense cross-modal interaction modeling between image data and text data.

The purpose of cross-modal encoding is to associate semantic information between two modalities. However, the problem is that image data and text data have different information densities. Generally speaking, image data, including video and static data, usually have natural continuous signals and high spatial redundancy. In addition, video data has high temporal and spatial redundancy. Therefore, image data usually needs to be encoded into hierarchical features through heavy models. However, text, especially natural language text, is discrete and highly semantic. Based on this fact, the inventors found that the feature extraction process for these two modalities of data is different.

Figure 4:
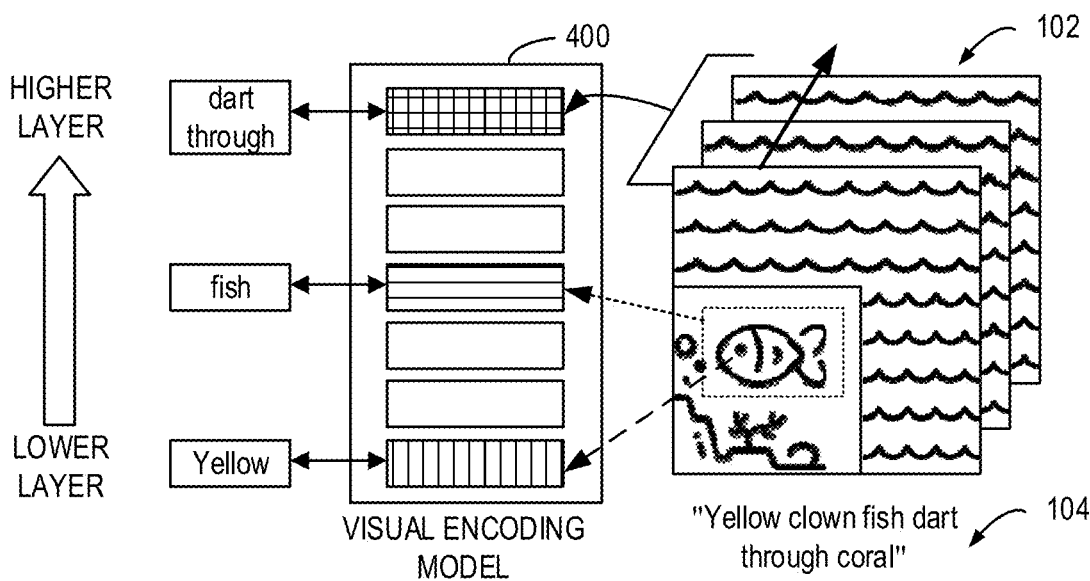
FIG. 4 illustrates a schematic diagram of an example of the information density difference between image data and text data.

FIG. 4 illustrates a schematic diagram of an example of the difference in information density between image data and text data. It is assumed that the feature information of the image data 102 is extracted using a visual encoding model 400. The visual encoding model 400 is constructed to have a plurality of processing layers from low to high layers, each layer processing the input and providing the extracted intermediate feature representation to the next layer for further processing. It can be observed that the lower processing layer of the visual encoding model 400 can perceive low-level information in the image data 102, such as color information "Yellow". As the processing deepens, the visual encoding model 400 can perceive contours and other information in the image data 102, such as identifying objects "fish" therein. In the higher processing layer, by exploring the spatial domain of multiple video frames of the dynamic image data 102, the visual encoding model 400 can perceive the spatial information of the image data 102, that is, the motion information of objects in the image data "dart through".

It can be seen that due to the temporal and spatial redundancy of image data, the visual feature construction process of image data has a discrete level (from low to high). However, the textual features of text data are highly abstract, and there is no such discretization extraction from low to high. Therefore, the semantic granularity evolution of each modality is asynchronous during the feature extraction process, which is called asynchronous semantic alignment.

Considering such asynchronous semantic alignment, in embodiments of the present disclosure, there is proposed a feature extraction model architecture for constructing asynchronous cross-modal semantic alignment to perform feature extraction of image data and text data. Specifically, the feature extraction model is constructed to include sparse cross-modal encoding parts. In addition, the feature extraction model includes dense feature encoding for the image data and cuts off dense encoding of the text data. Such a feature extraction process can better capture the asynchronous semantic alignment of image and text modalities, enabling the model to learn and achieve accurate feature extraction of image and text modalities faster. The extracted features can accurately characterize the corresponding image data and text data, and thus can be applied to various downstream tasks related to images and text.

In the following, some example embodiments of the present disclosure are further described with reference to the accompanying drawings.

Figure 5:
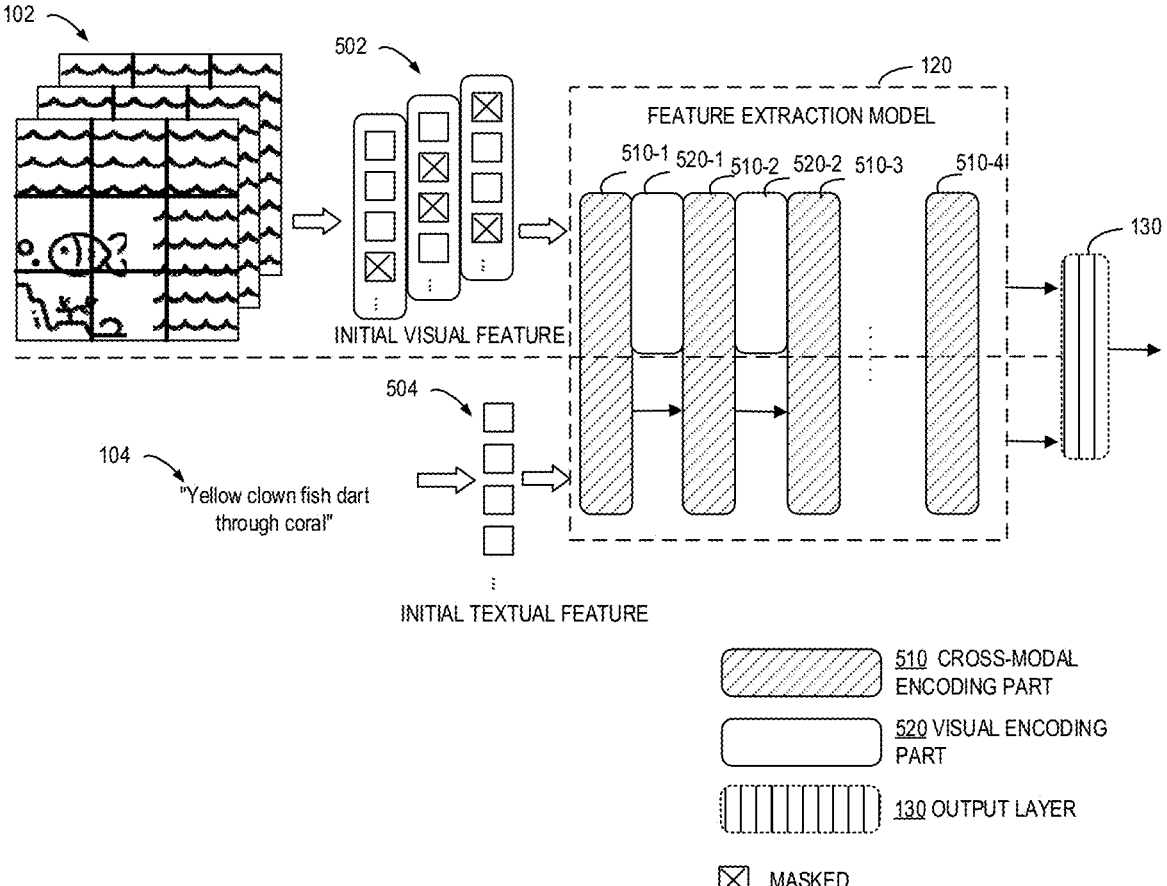
FIG. 5 illustrates a schematic diagram of an example structure of a feature extraction model in accordance with some embodiments of the present disclosure.

FIG. 5 illustrates a schematic diagram of an example structure of a feature extraction model 120 in accordance with some embodiments of the present disclosure. For the purpose of illustration only, it is still assumed that the feature extraction model 120 is to process the image data 102 and the text data 104 illustrated in the figure. It can be understood from the example environment of FIG. 2 that the image data and text data input to the feature extraction model 120 may be different at the different stages of pre-training, fine-tuning, and application. In some embodiments, the training stage of the feature extraction model 120 may be integrated together and does not need to be divided into the pre-training and fine-tuning stages as illustrated in FIG. 2.

As analyzed above, due to the different information densities of image and text data, dense cross-modal interaction (e.g., the architecture 303 based on unified stream processing) not only interferes with the semantic alignment of the two modalities, but also increases training overhead, including pre-training overhead. In embodiments of the present disclosure, an improved feature extraction model architecture is proposed. As illustrated in FIG. 5, the feature extraction model 120 is constructed to have alternatively deployed cross-modal encoding parts 510 and visual encoding parts 520 to achieve the asynchronous interaction between images and text.

"Alternatively deployed" means that a cross-modal encoding part 510 connects to a visual encoding part 520, which further connects to a next cross-modal encoding part 510, and so on. For example, in FIG. 5, a cross-modal encoding part 510-1 connects to a next visual encoding part 520-1, which in turn connects another cross-modal encoding part 510-2. The cross-modal encoding part 510-2 connects to a visual encoding part 520-2, which then connects to another cross-modal encoding part 510-3, and so on, until the final cross-modal encoding part 510-4.

Each cross-modal encoding part 510 (the cross-modal encoding part 510-1, 510-2, 510-3, . . . , 510-4, etc.) is configured to perform cross-modal feature encoding on the image data and the text data. Each visual encoding part 520 (the cross-modal encoding part 520-1, 520-2, 520-3, . . . ) is configured to perform uni-modal feature encoding on the image data. The feature extraction model 120 may not include a separate text modal encoding.

Thus, the feature encoding result of a previous cross-modal encoding part 510 on the text data is directly input to a next cross-modal encoding part 510 for further processing. Overall, in the feature extraction process of the feature extraction model 120, the image data is densely encoded, while the cross-modal interaction between the image and text is relatively sparse. Such asynchronous encoding can solve the feature extraction differences caused by the difference in information density between the image data and text data.

Specifically, it is assumed that image data 102 is dynamic image data, represented as $V \in \mathbb{R}^{T \times 3 \times H \times W}$, where T represents the time length, such as the number of multiple video frames; H and W represent the height and width of a single video frame; 3 represents the number of color channels of a video frame, depending on the color space applied, and other values can also be taken. Text data 104 is represented as $C \in \mathbb{R}^{L}$, where L represents the text length.

In the initial stage, the image data 102 can be converted into an initial visual feature 502, and the text data 104 can be converted into an initial textual feature 504, so as to convert the data into a multi-dimensional vector form for model processing. The initial visual feature 502 and the initial textual feature 504 are also called feature embeddings or embedded representations. Such feature conversion is represented as follows:

$$F_v = \mathcal{E}_{video}(V), F_t = \mathcal{E}_{text}(C) \qquad (1)$$

where $\mathcal{E}_{video}(\ )$ represents the feature conversion process of image data and $\mathcal{E}_{text}(\ )$ represents the feature conversion process of text data. $\mathcal{E}_{video}(\ )$ can be achieved by an image embedding model. In some embodiments, each image (or video frame) in the image data 102 can be divided into a plurality of visual blocks and each visual block can be converted into a form of feature embedding. For example, image data V can be divided into HW/P visual blocks with a resolution of P×P. In such implementations, $\mathcal{E}_{video}(\ )$ can be implemented as a visual block embedding model. $\mathcal{E}_{text}(\ )$ can be achieved through a word embedding model.

In some embodiments, the dimensions of the initial visual feature 502 and the initial textual feature 504 may be configured to be the same. For example, the converted initial visual feature 502 is represented as $F_v \in \mathbb{R}^{T \times L_v \times C}$, and the initial textual feature 504 is represented as $F_t \in \mathbb{R}^{T \times L_t \times C}$.

The initial visual feature 502 and the initial textual feature 504 are input to the feature extraction model 120 as representations of the image data 102 and the text data 104 for further processing. As mentioned above, in the feature extraction model 120, some processing parts (i.e., the cross-modal encoding parts 510) are configured to perform cross-modal feature encoding of the image and text modalities, and the other parts (i.e., the visual encoding parts 520) are configured to perform visual modal feature encoding of the image modality.

Herein, the feature encoding results of the cross-modal encoding parts 510 for the image modality are referred to as intermediate visual features, and the feature encoding results for the text modality are referred to as intermediate textual features. Similarly, the feature encoding results of the visual encoding parts 520 for the image modality are also referred to as intermediate visual features. In this way, the intermediate visual features extracted by a current cross-modal encoding part 510 will be provided to the connected visual encoding part 520 for further visual modal feature encoding to obtain an additional intermediate visual feature. The intermediate textual feature extracted by the current visual encoding part 520 and the intermediate visual feature output by the visual encoding part 520 are provided to the next visual encoding part 520 for processing. For the first processing part of the feature extraction model 120, the input is the initial visual feature 502 (and the initial textual feature 504, if the first processing part is a cross-modal encoding part). The foregoing process is iteratively repeated until reaching the last part of the feature extraction model 120. The feature output by the last part is considered to be the target visual feature of the image data 102 and the target textual feature of the text data 104.

For a cross-modal encoding part 510, its inputs (e.g., an intermediate visual feature and an intermediate visual feature, or the initial visual feature and initial visual feature) are concatenated as $F \in \mathbb{R}^{T \times (L_v L_t) \times C}$ for processing.

In some embodiments, a cross-modal encoding part 510 may include one or more network layers, and a visual encoding part 520 may also include one or more network layers. In some embodiments, a cross-modal encoding part 510 and/or a visual encoding part 520 may include a transformer layer. The transformer layer may include a multi-head self-attention (MSA) block and a feed-forward network (FFN) block. Of course, only some example implementations of cross-modal encoding part 510 and visual encoding part 520 are provided here. In practical applications, the network layers used by the cross-modal encoding part 510 and/or visual encoding part 520 can be configured according to actual requirements. The cross-modal encoding part 510 and visual encoding part 520 can also be configured as different types of network layers. In addition, different cross-modal encoding parts 510 can also apply different types of network layers to perform the cross-modal feature encoding. Similarly, the visual encoding parts 520 may employ different types of network layers to perform visual modal feature encoding.

According to the deployment mode of the feature extraction model 210 described above, the processing of each network layer in the feature extraction model 210 can be defined as follows:

$$F_v^n, F_t^n = \begin{cases} \Phi^n([F_v^{n-1}, F_t^{n-1}]) & \text{for the cross-model encoding part} \\ \Phi^n(F_v^{n-1}), F_t^{n-1} & \text{for the visual encoding part} \end{cases} \quad (2)$$

where $1 \leq n \leq N$, and N represents the total number of network layers in the feature extraction model 210; [•, •] represents the feature concatenation of two modalities; represents the intermediate visual feature at the $n^{-th}$ network layer;

$$F_v^n$$

represents an intermediate textual feature at the $n^{-th}$ network layer; $\Phi^n$ represents the feature encoding processing of the $n^{-th}$ network layer. From the above Equation (2), it can be seen that if the $n^{-th}$ network layer in the feature extraction model 210 belongs to the cross-modal encoding part 510, the network layer processes the concatenated intermediate visual feature and intermediate textual feature $$[F_v^{n-1}, F_t^{n-1}]$$

from the previous layer. If the $n^{-th}$ network layer in the feature extraction model 210 belongs to the visual encoding part 520, the network layer only processes the intermediate visual feature $$F_v^{n-1}$$

fom the previous layer, and will not process the intermediate textual feature.

The cross-modal encoding part 510 and the visual encoding part 520 can be alternatively arranged in various ways. Although the cross-modal encoding part 510 is deployed as the first processing part is illustrated in FIG. 5, the visual encoding part 520 can also be deployed as the first processing part. In some embodiments, the last processing part of the feature extraction model 120 can be deployed as the cross-modal encoding part 510, although such constraint may not be applied in other embodiments.

Each cross-modal encoding part 510 and each visual encoding part 520 may be configured to have one or more network layers, i.e., different network depths. The network layer in the cross-modal encoding part 510 may be referred to as a cross-modal encoding layer, and the network layer in the visual encoding part 520 may be referred to as a visual encoding layer.

Figure 6:
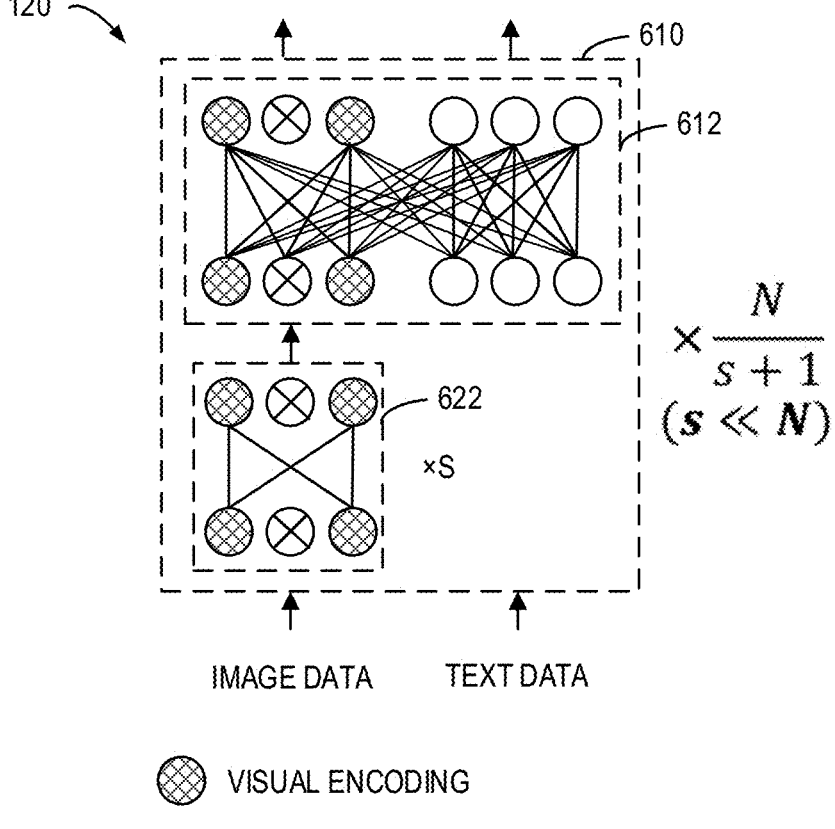
FIG. 6 illustrates a schematic diagram of a simplified architecture of a feature extraction model in accordance with some embodiments of the present disclosure.

As mentioned previously, in the feature extraction model 120, the cross-modal encoding parts 510 and visual encoding parts 520 are alternatively deployed. In some embodiments, the feature extraction model 120 may include a plurality of pairs of alternating cross-modal encoding parts 510 and visual encoding parts 520. FIG. 6 illustrates a schematic diagram of a simplified architecture of the feature extraction model 120 in accordance with some embodiments of the present disclosure. As illustrated in FIG. 6, the feature extraction model 120 may include a plurality of processing parts 610, each including one or more (s) visual encoding layers 622 and one or more cross-modal encoding layers 612.

In order to compare with the feature extraction architecture illustrated in FIGS. 3A to 3C, it can be assumed that if the same depth of the feature extraction is applied on the image data, the feature extraction model 120 can be deployed with $$\frac{N}{s+1}$$

processing parts 610, and s can be set much smaller than N. Of course, in practical applications, the cross-modal encoding parts 510 and visual encoding parts 520 in the feature extraction model 120 can be alternatively deployed in many other ways.

It is assumed that the total number of network layers in the feature extraction model 120 is N, some of which can be configured as cross-modal encoding layers, while others can be configured as visual encoding layers. As compared with the visual encoding layers, the cross-modal encoding layers need more parameters and thus have relatively high training and application costs.

Figure 7:
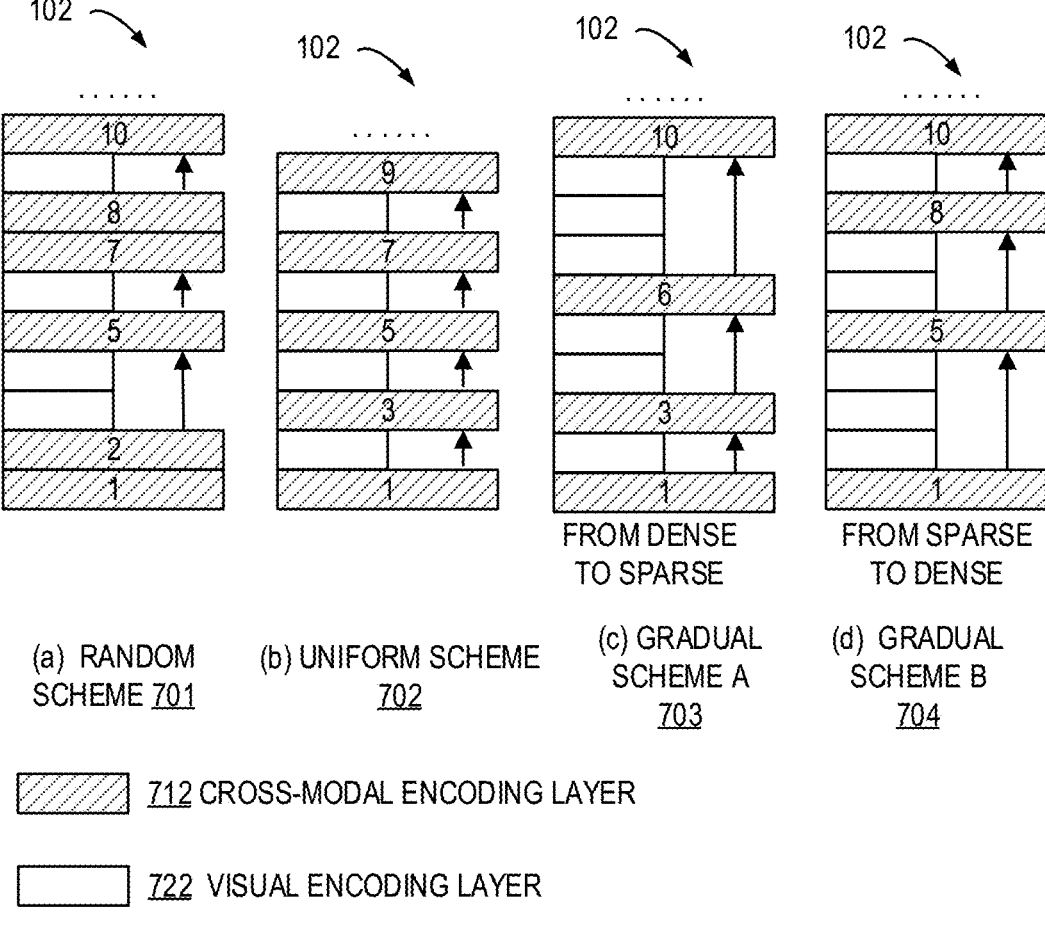
FIG. 7 illustrates a schematic diagram of some example deployment of different coding portions in the feature extraction model in accordance with some embodiments of the present disclosure.

FIG. 7 illustrates a schematic diagram of some example deployment methods of different encoding parts in the feature extraction model 120 in accordance with some embodiments of the present disclosure. In some embodiments, some network layers can be randomly selected as cross-modal encoding layers based on a random scheme. As illustrated in FIG. 7, based on the random scheme 701, Network Layers 1 and 2 in the feature extraction model 120 are selected as cross-modal encoding layers 712 (forming a cross-modal encoding part); Network Layer 5 is selected as cross-modal encoding layer 712 (forming another cross-modal encoding part); Network Layers 7 and 8 are selected as cross-modal encoding layers 712 (forming another cross-modal encoding part); Network Layer 10 is selected as a cross-modal encoding layer 712 (forming a further cross-modal encoding part). Of the remaining network layers, Network Layers 3 and 4 are deployed as visual encoding layers 722 (forming one visual encoding part), Network Layer 6 is deployed as a visual encoding layers 722 (forming another visual encoding part), and Network Layer 9 is also deployed as a visual encoding layer 722 (forming a further visual encoding part).

In some embodiments, in order to obtain high-quality textual feature and visual feature extraction at a lower cost, in addition to the random scheme, some predetermined criteria can be applied to deploy the cross-modal encoding layers and the visual encoding layers.

In some embodiments, according to a unified scheme, the cross-modal encoding layers in the feature extraction model 120 may be deployed with predetermined spacings. The predetermined spacings may be quantized to a predetermined number of visual encoding layers. That is, according to the unified scheme, the visual encoding parts between two adjacent cross-modal encoding parts may include a predetermined number of visual encoding layers. The predetermined number may be 1, 2, 3, or any other suitable number. It is assumed that the cross-modal encoding parts are deployed with predetermined spacings w starting from the $s_1$ network layer. According to the unified scheme deployment, the following network layers in the feature extraction model 120 may be selected as cross-modal encoding layers:

$$n \in \{s_i\}_{i=1}^{M}, \text{ where } s_i = s_{i-1} + w \qquad (3)$$

where $1 \leq s_1 \leq s_M \leq N$, w is an integer and $1 \leq w \leq N-1$.

According to the above Equation (3), the $n^{-th}$ network layer $$\left(n \in \{s_i\}_{i=1}^{M}\right)$$

in the feature extraction model 120 is deployed as a cross-modal encoding layer in a cross-modal encoding part (assuming that each cross-modal encoding part includes a single cross-modal encoding layer), and there are a total of M cross-modal encoding layers in the feature extraction model 120. There are always w visual encoding layers deployed between the $s_{i-1}^{-th}$ network layer and the $s^{-th}$ network layer.

As illustrated in FIG. 7, according to the unified scheme 702, the network layers in the feature extraction model 120 are alternately deployed as cross-modal encoding layers 712 and visual encoding layers 722. for example, the first, third, fifth, seventh, and ninth network layers are deployed as cross-modal encoding layers 712, the second, fourth, sixth, eighth, and tenth network layers are deployed as a visual encoding layers 722, and so on.

In the example of FIG. 7, w is configured as 1 and $s_1$=1, that is, the first network layer is the cross-modal encoding layer 712. If the parameter w is set to a larger value, the cost of cross-modal feature encoding is lower. If w is too large, that is, the cross-modal encoding feature is too sparse, it may also affect the generalization capability of the extracted features. In practical applications, a trade-off can be made between computational cost and model representation.

In some embodiments, the cross-modal encoding part can also be deployed based on a gradual scheme. For example, unlike the unified scheme, the cross-modal extraction part can be set at gradual spacings starting from the starting position. According to the deployment of the gradual scheme, the following network layers in the feature extraction model 120 can be selected as cross-modal encoding layers:

$$n \in \{s_i\}_{i=1}^{M}, \text{ where } s_i = s_{i-1} + (w - i * k) \qquad (4)$$

where $1 \leq s_1 \leq s_M \leq N$, and (w−i*k) is the gradual spacing. w and k are integers, and $1 \leq w \leq N-1$, M*k$\leq$w. According to the above Equation (4), the $n^{-th}$ network layer $$\left(n \in \{s_i\}_{i=1}^{M}\right)$$

in the feature extraction model 120 is deployed as a cross-modal encoding layer in the cross-modal encoding part (assuming that each cross-modal encoding part includes a single cross-modal encoding layer), and there are a total of M cross-modal encoding layers in the feature extraction model 120.

In the above Equation (4), if k>0, the spacing between adjacent cross-modal encoding parts (i.e., the number of visual encoding layers deployed therein) gradually increases, presenting a cross-modal interaction from dense to sparse. As illustrated in FIG. 7, according to Gradual Scheme a 703, the first, third, sixth, and tenth network layers are deployed as cross-modal encoding layers 712, respectively. For the first and third network layers, these two adjacent cross-modal encoding parts are spaced by a visual encoding layer 722; for the third and sixth network layers, these two adjacent cross-modal encoding parts are spaced by two visual encoding layers 722; for the sixth and tenth network layers, these two adjacent cross-modal encoding parts are spaced by four visual encoding layers 722, and so on. From the lower to higher layers of the overall model, the cross-modal feature encoding changes from being dense to being sparse.

In the above Equation (4), if k<0, the spacing between adjacent cross-modal encoding parts (i.e., the number of visual encoding layers deployed therein) gradually decreases, indicating cross-modal interaction from sparse to dense. As illustrated in FIG. 7, according to Gradual Scheme b 704, the first, fifth, eighth, and tenth network layers are deployed as cross-modal encoding layers 712, respectively. For the first and fifth network layers, these two adjacent cross-modal encoding parts are spaced by four visual encoding layers 722; for the fifth and eighth network layers, these two adjacent cross-modal encoding parts are spaced by two visual encoding layers 722; for the eighth and tenth network layers, these two adjacent cross-modal encoding parts are spaced by one visual encoding layer 722, and so on. From the lower to higher layers of the overall model, cross-modal feature encoding changes from being sparse to being dense.

Although in the embodiments illustrated in FIG. 7, it is assumed that each cross-modal encoding part includes a single cross-modal encoding layer, but the cross-modal encoding part may be provided as having a plurality of cross-modal encoding layers.

The sparse-to-dense cross-modal interaction strategy is actually equivalent to reducing cross-modal interaction at low-level features, but maintaining dense interaction at high-level features. The dense-to-sparse cross-modal interaction strategy is the opposite strategy. These strategies can be selected as required in practical applications.

It would be appreciated that the feature extraction model 120 in the schemes illustrated in FIG. 7 are merely some examples, where the specific number and arrangement of the cross-modal encoding layers and the visual encoding layers can be selected according to the actual applications.

As previously analyzed, images and text have different semantic densities, and frequently aligning and interacting highly semantic text with highly redundant image data is not only unnecessary, but also limits the learning of feature representations of visual information. Therefore, the feature extraction model architecture proposed in this disclosure cuts off a large number of unnecessary dense cross-modal interactions and text modeling, while still retaining slightly dense modeling of image data. This can significantly improve the characterization capability of the extracted features.

The temporal and/or spatial redundancy of image data causes asynchronous semantic alignment of text and image data in feature extraction. The inventors have also found that a large number of visual blocks of image data are also redundant for cross-modal alignment. For example, multiple regions in a single image may represent the same meaning, and multiple consecutive video frames may also have more redundant regions. Considering such redundancy, in order to save training costs during the training stage, in some embodiments, sparse block sampling and masking of image data 102 are input to the feature extraction model 120 for processing.

In some embodiments, sparse block sampling and masking can be applied to the training data of the feature extraction model 120, especially to the image data in the training data of the pre-training stage. Thus, during training, the target visual features and target textual features extracted from the image data 102 and the text data 104 are used to perform parameter updates to the feature extraction model 120. The amount of training data in the pre-training stage is often very large. By masking the image data, the data processing amount can be significantly reduced without affecting the model learning efficiency.

In particular, it is assumed that the image data 102 and the text data 104 input to the feature extraction model 102 are sample image data and sample text data for model training. It is also assumed that the image data 102 includes a plurality of video frames in a video clip, such as T video frames, where T is greater than or equal to 1. At least one visual block of at least one video frame in the T video frames can be selected in the time domain and the spatial domain for masking to obtain T masked video frames. In some embodiments, it is assumed that each video frame is divided into a plurality of visual blocks. A mask map $$M = \{m_t\}_{t=1}^{T}$$

is applied to each of the T video frames, where $m_t \in \mathbb{R}^{H \times W}$ indicates whether each visual block in the $t^{th}$ video frame is to be masked.

For the masked visual blocks, their corresponding features can be masked (such as the masked part in the initial visual feature 502 illustrated in FIG. 5). Accordingly, during the model extraction process, the corresponding processing units in the cross-modal encoding part and the visual encoding part can be cut off without processing this part of the data.

There are various ways to select a visual block to be masked from the video frames. In some embodiments, according to a random masking scheme, at least one visual block of each video frame from the image data 102 is randomly masked. In some embodiments, visual blocks of each video frame are selected by a given ratio to be masked. Such a random masking scheme is temporally independent. Such a masking scheme focuses only on remove possible redundant content in each frame, without concern for temporal correlation between frames.

Figure 8:
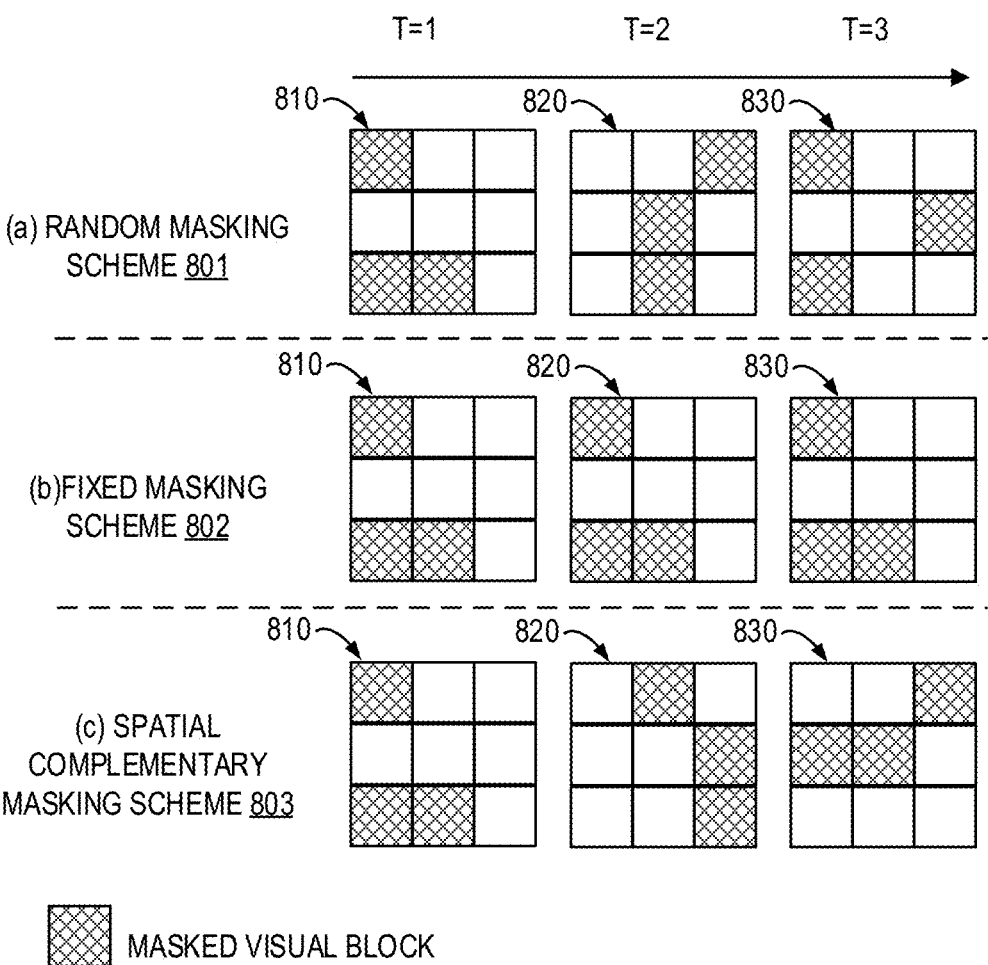
FIG. 8 illustrates a schematic diagram of an example mask mode of sample image data in accordance with some embodiments of the present disclosure.

FIG. 8 illustrates a schematic diagram of an example of the mask mode of the sample image data in accordance with some embodiments of the present disclosure. In the example of FIG. 8, it is assumed that T=3, i.e., the image data including video frames 810, 820 and 830. According to the random masking scheme 801, for each video frame, visual blocks are randomly selected at a given ratio (e.g., ⅓) to be masked. The resulting masked video frames are provided to the feature extraction model 120 for performing training of the feature extraction model 120.

In some embodiments, according to a fixed mask scheme, a predetermined mask map $m_*$ is applied to mask each video frame in the image data 102, to obtain a plurality of masked video frames. The predetermined mask map $m_*$ indicates at least one visual block at a predetermined position in a video frame to be masked. In some embodiments, $m_*$ may be randomly generated and may indicate a given ratio of visual blocks to be masked. Such a fixed mask scheme can eliminate potential redundant content through rough temporal and spatial consistency. As illustrated in FIG. 8, according to the fixed masking scheme 802, visual blocks at fixed positions in video frames 810, 820, and 830 are masked. In some embodiments, different predetermined mask maps may be applied for different sample image data (e.g., different video clips).

In some embodiments, at least one visual block can be selected for masking from each of the plurality of video frames based on a spatial complementary masking scheme, with the positions of the masked visual blocks in the plurality of video frames being different from one frame to another frame. In some embodiments, the visual blocks selected for masking from the plurality of video frames are complementary each other to form a completed "video frame". As illustrated in FIG. 8, according to the spatial complementary masking scheme 803, in each of the video frames 810, 820, and 830, one-third of the visual blocks (i.e., three visual blocks) in all nine visual blocks are selected for masking. The positions of the masked visual blocks in the three video frames are different from one frame to another frame. The nine visual blocks selected for masking from all three video frames will form the completed video frame. As compared with the previous two schemes, the spatial complementary masking scheme captures more redundant and more diverse visual information from the video frames.

It would be appreciated that the number of visual block divisions illustrated in FIG. 8 and the visual blocks selected for masking in each video frame under each scheme are examples. Other masking results may occur in different scenarios.

Sparse visual block sampling and masking can reduce computational overhead, especially during training, while maintaining model performance.

As mentioned earlier, the feature extraction model 120 can be pre-trained to learn better representations of image and text modal data from a large amount of data during pre-training. During the pre-training stage, the pre-training tasks can be constructed to achieve certain pre-training objectives. In some embodiments, the pre-training tasks may include an image and text matching task. In this task, for a given pair of matching sample image data and sample text data, the sample image data can be randomly replaced with other sample image data with a certain probability (e.g., a probability of 0.5). Then, the target visual feature and target textual feature in each pair of sample image data and sample text data are extracted by the feature extraction model 120. The extracted target visual feature and target textual feature are input to the output layer 130 (see FIG. 5) for pre-training, and the output layer 130 determines whether the input sample image data and sample text data match based on the target visual feature and target textual feature. The objective of the pre-training task is to iteratively update the parameter values of the feature extraction model 120 so that the target visual feature and the target textual feature output by the feature extraction model 120 can be used to accurately determine whether the sample image data and the sample text data of the given input match with each other.

In some embodiments, the pre-training tasks may further include a masked language modeling (MLM) task. In this pre-training task, a portion of the text in the sample text data is masked, and the masked sample text data and corresponding sample image data are input to the feature extraction model 120. Then, the masked portion of the text in the sample text data is predicted based on the target visual feature and target textual feature output by the feature extraction model 120. The objective of this pre-training task is to correctly predict the masked portion of the text. To achieve this task, the target visual feature and target textual feature output by the feature extraction model 120 can be provided to the output layer 130 for predicting the masked portion of the text in the sample text data.

Some embodiments at the pre-training stage of feature extraction model 120 have been discussed above. In the fine-tuning stage and model application stage, feature extraction model 120 can be combined with downstream task-specific output layers according to the requirements of actual tasks, which are not be repeated here.

FIG. 9 illustrates a flowchart of a process 900 for multimodal data processing in accordance with some embodiments of the present disclosure. The process 900 may be implemented at the cross-modal data processing system 110 of FIG. 1, where the cross-modal data processing system 110 may include the model pre-training system 210, the model fine-tuning system 220, and/or the model application system 230 of FIG. 2.

In block 910, the cross-modal data processing system 110 obtains image data and text data.

At block 920, the cross-modal data processing system 110 extracts, using a feature extraction model, a target visual feature of the image data and a target textual feature of the text data. The feature extraction model includes alternatively deployed cross-modal encoding parts and visual encoding parts. The extracting at block 920 includes: at block 922, cross-modal feature encoding is performed on a first intermediate visual feature of the image data and a first intermediate textual feature of the text data using a first cross-modal encoding part of the feature extraction model, to obtain a second intermediate visual feature and a second intermediate textual feature; at block 924, visual modal feature encoding is performed on the second intermediate visual feature using a first visual encoding part of the feature extraction model, to obtain a third intermediate visual feature; at block 926, cross-modal feature encoding is performed on the third intermediate visual feature and the second intermediate textual feature using a second cross-modal encoding part of the feature extraction model, to obtain a fourth intermediate visual feature and a third intermediate textual feature; and at block 928, the target visual feature and the target textual feature are determined based on the fourth intermediate visual feature and the third intermediate textual feature.

In some embodiments, the process 900 further includes: determining a match degree between the image data and the text data based on the target visual feature and the target textual feature.

In some embodiments, determining the target visual feature and the target textual feature based on the fourth intermediate visual feature and the third intermediate textual feature includes: performing visual modal feature encoding on the fourth intermediate visual feature using a second visual encoding part of the feature extraction model, to obtain a fifth intermediate visual feature; and determining the target visual feature and the target textual feature based on the fifth intermediate visual feature and the third intermediate textual feature.

In some embodiments, the feature extraction model includes a plurality of pairs of cross-modal encoding parts and visual encoding parts that are alternately deployed, and where a visual encoding part deployed between two adjacent cross-modal encoding parts includes a predetermined number of visual encoding layers.

In some embodiments, the feature extraction model includes a plurality of pairs of alternating cross-modal encoding parts and visual encoding parts, and where a visual encoding part deployed between a first pair of adjacent cross-modal encoding parts includes a first number of visual encoding layers, and a visual encoding part deployed between a second pair of adjacent cross-modal encoding parts includes a second number of visual encoding layers, the first number being different from the second number.

In some embodiments, the image data and the text data are included in training data for the feature extraction model, and the image data includes a plurality of video frames in a video clip. In some embodiments, extracting the target visual feature and the textual feature includes: generating a plurality of masked video frames by masking at least one visual block of at least one of the plurality of video frames; and extracting target visual features of the plurality of masked video frames and a target textual feature of the text data using the feature extraction model.

In some embodiments, the process 900 further includes: performing parameter update to the feature extraction model based on the target visual features and the target textual feature.

In some embodiments, generating the plurality of masked video frames includes: randomly masking at least one visual block of respective ones of the plurality of video frames, to obtain the plurality of masked video frames.

In some embodiments, generating the plurality of masked video frames includes: masking respective ones of the plurality of video frames using a predetermined mask map, to obtain the plurality of masked video frames, the predetermined mask map indicating at least one visual block to be masked at a predetermined position in a video frame.

In some embodiments, generating the plurality of masked video frames includes: selecting at least one visual block for masking from respective ones of the plurality of video frames, to obtain the plurality of masked video frames, positions of the masked visual blocks in the plurality of video frames being different from each other.

Figure 10:
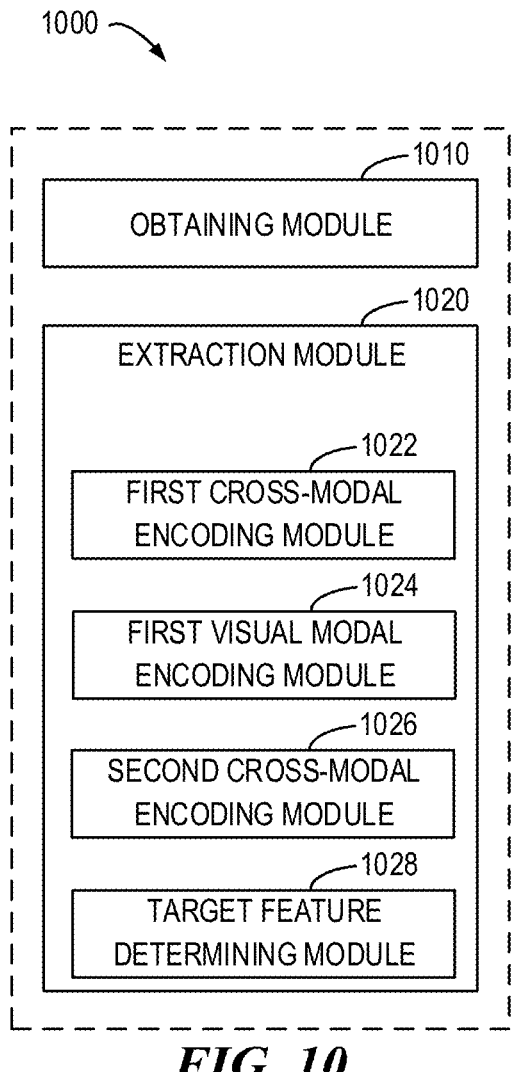
FIG. 10 illustrates a block diagram of an apparatus for multimodal data processing according to some embodiments of the present disclosure.

FIG. 10 shows a block diagram of an apparatus 1000 for multimodal data processing in accordance with some embodiments of the present disclosure. The apparatus 1000 may be implemented, for example, or included at cross-modal data processing system 110 of FIG. 1, where cross-modal data processing system 110 may include the model pre-training system 210, model fine-tuning system 220, and/or model application system 230 of FIG. 2. Various modules/components in the apparatus 1000 may be implemented by hardware, software, firmware, or any combination thereof.

As shown, the apparatus 1000 includes an obtaining module 1010 configured to obtain image data and text data. The apparatus 1000 further includes an extraction module 1020 configured to extract, using a feature extraction model, a target visual feature of the image data and a target textual feature of the text data, the feature extraction model includes alternately deployed cross-modal encoding parts and visual encoding parts. The extraction module 1020 includes: a first cross-modal encoding module 1022 configured to perform, using a first cross-modal encoding part of the feature extraction model, cross-modal feature encoding on a first intermediate visual feature of the image data and a first intermediate textual feature of the text data, to obtain a second intermediate visual feature and a second intermediate textual feature; a first visual modal encoding module 1024 configured to perform, using a first visual encoding part of the feature extraction model, visual modal feature encoding on the second intermediate visual feature, to obtain a third intermediate visual feature; a second cross-modal encoding module 1026 configured to perform, using a second cross-modal encoding part of the feature extraction model, cross-modal feature encoding on the third intermediate visual feature and the second intermediate textual feature, to obtain a fourth intermediate visual feature and a third intermediate textual feature; and a target feature determining module 1028 configured to determine the target visual feature and the target textual feature based on the fourth intermediate visual feature and the third intermediate textual feature.

In some embodiments, the apparatus 1000 further includes: a match degree determining module configured to determine a match degree between the image data and the text data based on the target visual feature and the target textual feature.

In some embodiments, the target feature determining module 1028 includes: a second visual modal encoding module configured to perform visual modal feature encoding on the fourth intermediate visual feature using a second visual encoding part of the feature extraction model, to obtain a fifth intermediate visual feature; and a further target feature determining module configured to determine the target visual feature and the target textual feature based on the fifth intermediate visual feature and the third intermediate textual feature.

In some embodiments, the feature extraction model includes a plurality of pairs of cross-modal encoding parts and visual encoding parts that are alternately deployed, and where a visual encoding part deployed between two adjacent cross-modal encoding parts includes a predetermined number of visual encoding layers.

In some embodiments, the feature extraction model includes a plurality of pairs of alternating cross-modal encoding parts and visual encoding parts, and where a visual encoding part deployed between a first pair of adjacent cross-modal encoding parts includes a first number of visual encoding layers, and a visual encoding part deployed between a second pair of adjacent cross-modal encoding parts includes a second number of visual encoding layers, the first number being different from the second number.

In some embodiments, the image data and the text data are included in training data for the feature extraction model, and where the image data includes a plurality of video frames in a video clip. In some embodiments, the extracting module 1020 includes: a masking module configured to generate a plurality of masked video frames by masking at least one visual block of at least one of the plurality of video frames; and a masking-based extracting module configured to extract target visual features of the plurality of masked video frames and a target textual feature of the text data using the feature extraction model.

In some embodiments, the apparatus 1000 further includes: a parameter updating module configured to perform parameter update to the feature extraction model based on the target visual features and the target textual feature.

In some embodiments, the masking module includes: a random masking module configured to randomly mask at least one visual block of respective ones of the plurality of video frames, to obtain the plurality of masked video frames.

In some embodiments, the masking module includes: a fixed masking module configured to mask respective ones of the plurality of video frames using a predetermined mask map, to obtain the plurality of masked video frames, the predetermined mask map indicating at least one visual block to be masked at a predetermined position in a video frame.

In some embodiments, the masking module includes: a complementary masking module configured to select at least one visual block for masking from respective ones of the plurality of video frames, to obtain the plurality of masked video frames, positions of the masked visual blocks in the plurality of video frames being different from each other.

Figure 11:
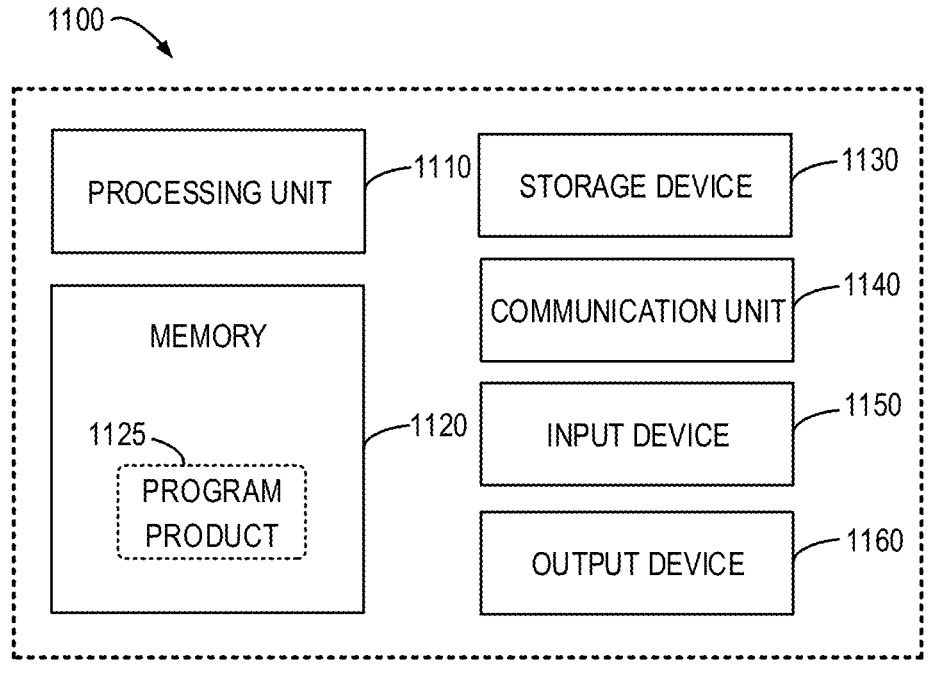
FIG. 11 illustrates an electronic device in which one or more embodiments of the present disclosure can be implemented.

FIG. 11 illustrates a block diagram of an electronic device 1100 in which one or more embodiments of the present disclosure can be implemented. It would be appreciated that the electronic device 1100 shown in FIG. 11 is only an example and should not constitute any restriction on the function and scope of the embodiments described herein. The electronic device 1100 may be used, for example, to implement the cross-modal data processing system 110 of FIG. 1, where the cross-modal data processing system 110 may include the model pre-training system 210, the model fine-tuning system 220, and/or the model application system 230 of FIG. 2. The electronic device 1100 may also be used to implement the apparatus 1000 of FIG. 10.

As shown in FIG. 11, the electronic device 1100 is in the form of a general computing device. The components of the electronic device 1100 may include, but are not limited to, one or more processors or processing units 1110, a memory 1120, a storage device 1130, one or more communication units 1140, one or more input devices 1150, and one or more output devices 1160. The processing unit 1110 may be an actual or virtual processor and can execute various processes according to the programs stored in the memory 1120. In a multiprocessor system, multiple processing units execute computer executable instructions in parallel to improve the parallel processing capability of the electronic device 1100.

The electronic device 1100 typically includes a variety of computer storage medium. Such medium may be any available medium that is accessible to the electronic device 1100, including but not limited to volatile and non-volatile medium, removable and non-removable medium. The memory 1120 may be volatile memory (for example, a register, cache, a random access memory (RAM)), a non-volatile memory (for example, a read-only memory (ROM), an electrically erasable programmable read-only memory (EEPROM), a flash memory) or any combination thereof. The storage device 1130 may be any removable or non-removable medium, and may include a machine-readable medium, such as a flash drive, a disk, or any other medium, which can be used to store information and/or data (such as training data for training) and can be accessed within the electronic device 1100.

The electronic device 1100 may further include additional removable/non-removable, volatile/non-volatile storage medium. Although not shown in FIG. 11, a disk driver for reading from or writing to a removable, non-volatile disk (such as a "floppy disk"), and an optical disk driver for reading from or writing to a removable, non-volatile optical disk can be provided. In these cases, each driver may be connected to the bus (not shown) by one or more data medium interfaces. The memory 1120 may include a computer program product 1125, which has one or more program modules configured to perform various methods or acts of various embodiments of the present disclosure.

The communication unit 1140 communicates with a further computing device through the communication medium. In addition, functions of components in the electronic device 1100 may be implemented by a single computing cluster or multiple computing machines, which can communicate through a communication connection. Therefore, the electronic device 1100 may be operated in a networking environment using a logical connection with one or more other servers, a network personal computer (PC), or another network node.

The input device 1150 may be one or more input devices, such as a mouse, a keyboard, a trackball, etc. The output device 1160 may be one or more output devices, such as a display, a speaker, a printer, etc. The electronic device 1100 may also communicate with one or more external devices (not shown) through the communication unit 1140 as required. The external device, such as a storage device, a display device, etc., communicate with one or more devices that enable users to interact with the electronic device 1100, or communicate with any device (for example, a network card, a modem, etc.) that makes the electronic device 1100 communicate with one or more other computing devices. Such communication may be executed via an input/output (I/O) interface (not shown).

According to example implementation of the present disclosure, a computer-readable storage medium is provided, on which a computer-executable instruction or computer program is stored, where the computer-executable instructions or the computer program is executed by the processor to implement the method described above. According to example implementation of the present disclosure, a computer program product is also provided. The computer program product is physically stored on a non-transient computer-readable medium and includes computer-executable instructions, which are executed by the processor to implement the method described above.

Various aspects of the present disclosure are described herein with reference to the flow chart and/or the block diagram of the method, the device, the equipment and the computer program product implemented in accordance with the present disclosure. It would be appreciated that each block of the flowchart and/or the block diagram and the combination of each block in the flowchart and/or the block diagram may be implemented by computer-readable program instructions.

These computer-readable program instructions may be provided to the processing units of general-purpose computers, special computers or other programmable data processing devices to produce a machine that generates a device to implement the functions/acts specified in one or more blocks in the flow chart and/or the block diagram when these instructions are executed through the processing units of the computer or other programmable data processing devices. These computer-readable program instructions may also be stored in a computer-readable storage medium. These instructions enable a computer, a programmable data processing device and/or other devices to work in a specific way. Therefore, the computer-readable medium containing the instructions includes a product, which includes instructions to implement various aspects of the functions/acts specified in one or more blocks in the flowchart and/or the block diagram.

The computer-readable program instructions may be loaded onto a computer, other programmable data processing apparatus, or other devices, so that a series of operational steps can be performed on a computer, other programmable data processing apparatus, or other devices, to generate a computer-implemented process, such that the instructions which execute on a computer, other programmable data processing apparatus, or other devices implement the functions/acts specified in one or more blocks in the flowchart and/or the block diagram.

The flowchart and the block diagram in the drawings show the possible architecture, functions and operations of the system, the method and the computer program product implemented in accordance with the present disclosure. In this regard, each block in the flowchart or the block diagram may represent a part of a module, a program segment or instructions, which contains one or more executable instructions for implementing the specified logic function. In some alternative implementations, the functions marked in the block may also occur in a different order from those marked in the drawings. For example, two consecutive blocks may actually be executed in parallel, and sometimes can also be executed in a reverse order, depending on the function involved. It should also be noted that each block in the block diagram and/or the flowchart, and combinations of blocks in the block diagram and/or the flowchart, may be implemented by a dedicated hardware-based system that performs the specified functions or acts, or by the combination of dedicated hardware and computer instructions.

Each implementation of the present disclosure has been described above. The above description is example, not exhaustive, and is not limited to the disclosed implementations. Without departing from the scope and spirit of the described implementations, many modifications and changes are obvious to ordinary skill in the art. The selection of terms used in this article aims to best explain the principles, practical application or improvement of technology in the market of each implementation, or to enable other ordinary skill in the art to understand the various embodiments disclosed herein.

What is claimed is:

1. A method for multimodal data processing, comprising:
obtaining image data and text data; and
extracting, using a feature extraction model, a target visual feature of the image data and a target textual feature of the text data, the feature extraction model comprises alternately deployed cross-modal encoding parts and visual encoding parts, and the extracting comprises:
performing, using a first cross-modal encoding part of the feature extraction model, cross-modal feature encoding on a first intermediate visual feature of the image data and a first intermediate textual feature of the text data, to obtain a second intermediate visual feature and a second intermediate textual feature;
performing, using a first visual encoding part of the feature extraction model, visual modal feature encoding on the second intermediate visual feature, to obtain a third intermediate visual feature;

performing, using a second cross-modal encoding part of the feature extraction model, cross-modal feature encoding on the third intermediate visual feature and the second intermediate textual feature, to obtain a fourth intermediate visual feature and a third intermediate textual feature; and determining the target visual feature and the target textual feature based on the fourth intermediate visual feature and the third intermediate textual feature.

2. The method of claim 1, further comprising:

determining a match degree between the image data and the text data based on the target visual feature and the target textual feature.

3. The method of claim 1, wherein determining the target visual feature and the target textual feature based on the fourth intermediate visual feature and the third intermediate textual feature comprises:

performing visual modal feature encoding on the fourth intermediate visual feature using a second visual encoding part of the feature extraction model, to obtain a fifth intermediate visual feature; and determining the target visual feature and the target textual feature based on the fifth intermediate visual feature and the third intermediate textual feature.

4. The method of claim 1, wherein the feature extraction model comprises a plurality of pairs of cross-modal encoding parts and visual encoding parts that are alternately deployed, and wherein a visual encoding part deployed between two adjacent cross-modal encoding parts comprises a predetermined number of visual encoding layers.

5. The method of claim 1, wherein the feature extraction model comprises a plurality of pairs of alternating cross-modal encoding parts and visual encoding parts, and wherein a visual encoding part deployed between a first pair of adjacent cross-modal encoding parts comprises a first number of visual encoding layers, and a visual encoding part deployed between a second pair of adjacent cross-modal encoding parts comprises a second number of visual encoding layers, the first number being different from the second number.

6. The method of claim 1, wherein the image data and the text data are comprised in training data for the feature extraction model, and wherein the image data comprises a plurality of video frames in a video clip, wherein extracting the target visual feature and the textual feature comprises:

generating a plurality of masked video frames by masking at least one visual block of at least one of the plurality of video frames; and extracting target visual features of the plurality of masked video frames and a target textual feature of the text data using the feature extraction model.

7. The method of claim 6, further comprising:

performing parameter update to the feature extraction model based on the target visual features and the target textual feature.

8. The method of claim 6, wherein generating the plurality of masked video frames comprises:

randomly masking at least one visual block of respective ones of the plurality of video frames, to obtain the plurality of masked video frames.

9. The method of claim 6, wherein generating the plurality of masked video frames comprises:

masking respective ones of the plurality of video frames using a predetermined mask map, to obtain the plurality of masked video frames, the predetermined mask map indicating at least one visual block to be masked at a predetermined position in a video frame.

10. The method of claim 6, wherein generating the plurality of masked video frames comprises:

selecting at least one visual block for masking from respective ones of the plurality of video frames, to obtain the plurality of masked video frames, positions of the masked visual blocks in the plurality of video frames being different from each other.

11. An electronic device, comprising:

at least one processing unit; and at least one memory coupled to the at least one processing unit and storing instructions executable by the at least one processing unit, the instructions, upon execution by the at least one processing unit, causing the device to perform:

obtaining image data and text data; and extracting, using a feature extraction model, a target visual feature of the image data and a target textual feature of the text data, the feature extraction model comprises alternately deployed cross-modal encoding parts and visual encoding parts, and the extracting comprises:

performing, using a first cross-modal encoding part of the feature extraction model, cross-modal feature encoding on a first intermediate visual feature of the image data and a first intermediate textual feature of the text data, to obtain a second intermediate visual feature and a second intermediate textual feature;

performing, using a first visual encoding part of the feature extraction model, visual modal feature encoding on the second intermediate visual feature, to obtain a third intermediate visual feature;

performing, using a second cross-modal encoding part of the feature extraction model, cross-modal feature encoding on the third intermediate visual feature and the second intermediate textual feature, to obtain a fourth intermediate visual feature and a third intermediate textual feature; and determining the target visual feature and the target textual feature based on the fourth intermediate visual feature and the third intermediate textual feature.

12. The device of claim 11, wherein determining the target visual feature and the target textual feature based on the fourth intermediate visual feature and the third intermediate textual feature comprises:

performing visual modal feature encoding on the fourth intermediate visual feature using a second visual encoding part of the feature extraction model, to obtain a fifth intermediate visual feature; and determining the target visual feature and the target textual feature based on the fifth intermediate visual feature and the third intermediate textual feature.

13. The device of claim 11, wherein the feature extraction model comprises a plurality of pairs of cross-modal encoding parts and visual encoding parts that are alternately deployed, and wherein a visual encoding part deployed between two adjacent cross-modal encoding parts comprises a predetermined number of visual encoding layers.

14. The device of claim 11, wherein the feature extraction model comprises a plurality of pairs of alternating cross-modal encoding parts and visual encoding parts, and wherein a visual encoding part deployed between a first pair of adjacent cross-modal encoding parts comprises a first number of visual encoding layers, and a visual encoding part deployed between a second pair of adjacent cross-modal encoding parts comprises a second number of visual encoding layers, the first number being different from the second number.

15. The device of claim 11, wherein the image data and the text data are comprised in training data for the feature extraction model, and wherein the image data comprises a plurality of video frames in a video clip, wherein extracting the target visual feature and the textual feature comprises:

generating a plurality of masked video frames by masking at least one visual block of at least one of the plurality of video frames; and extracting target visual features of the plurality of masked video frames and a target textual feature of the text data using the feature extraction model.

16. The device of claim 15, wherein the acts further comprise:

performing parameter update to the feature extraction model based on the target visual features and the target textual feature.

17. The device of claim 15, wherein generating the plurality of masked video frames comprises:

randomly masking at least one visual block of respective ones of the plurality of video frames, to obtain the plurality of masked video frames.

18. The device of claim 15, wherein generating the plurality of masked video frames comprises:

masking respective ones of the plurality of video frames using a predetermined mask map, to obtain the plurality of masked video frames, the predetermined mask map indicating at least one visual block to be masked at a predetermined position in a video frame.

19. The device of claim 15, wherein generating the plurality of masked video frames comprises:

selecting at least one visual block for masking from respective ones of the plurality of video frames, to obtain the plurality of masked video frames, positions of the masked visual blocks in the plurality of video frames being different from each other.

20. A non-transitory computer-readable storage medium, having a computer program stored thereon which, upon execution by a processor, causes the following acts to be performed:

obtaining image data and text data; and extracting, using a feature extraction model, a target visual feature of the image data and a target textual feature of the text data, the feature extraction model comprises alternately deployed cross-modal encoding parts and visual encoding parts, and the extracting comprises:

performing, using a first cross-modal encoding part of the feature extraction model, cross-modal feature encoding on a first intermediate visual feature of the image data and a first intermediate textual feature of the text data, to obtain a second intermediate visual feature and a second intermediate textual feature;

performing, using a first visual encoding part of the feature extraction model, visual modal feature encoding on the second intermediate visual feature, to obtain a third intermediate visual feature;

performing, using a second cross-modal encoding part of the feature extraction model, cross-modal feature encoding on the third intermediate visual feature and the second intermediate textual feature, to obtain a fourth intermediate visual feature and a third intermediate textual feature; and determining the target visual feature and the target textual feature based on the fourth intermediate visual feature and the third intermediate textual feature.

* * * * *